May 18, 1937.　　　G. B. SCHEIBELL　　　2,080,835
CONTROL SYSTEM
Original Filed April 11, 1930　　3 Sheets-Sheet 1

INVENTOR
Gordon Brown Scheibell,
BY
Wm. J. Herdman
ATTORNEY

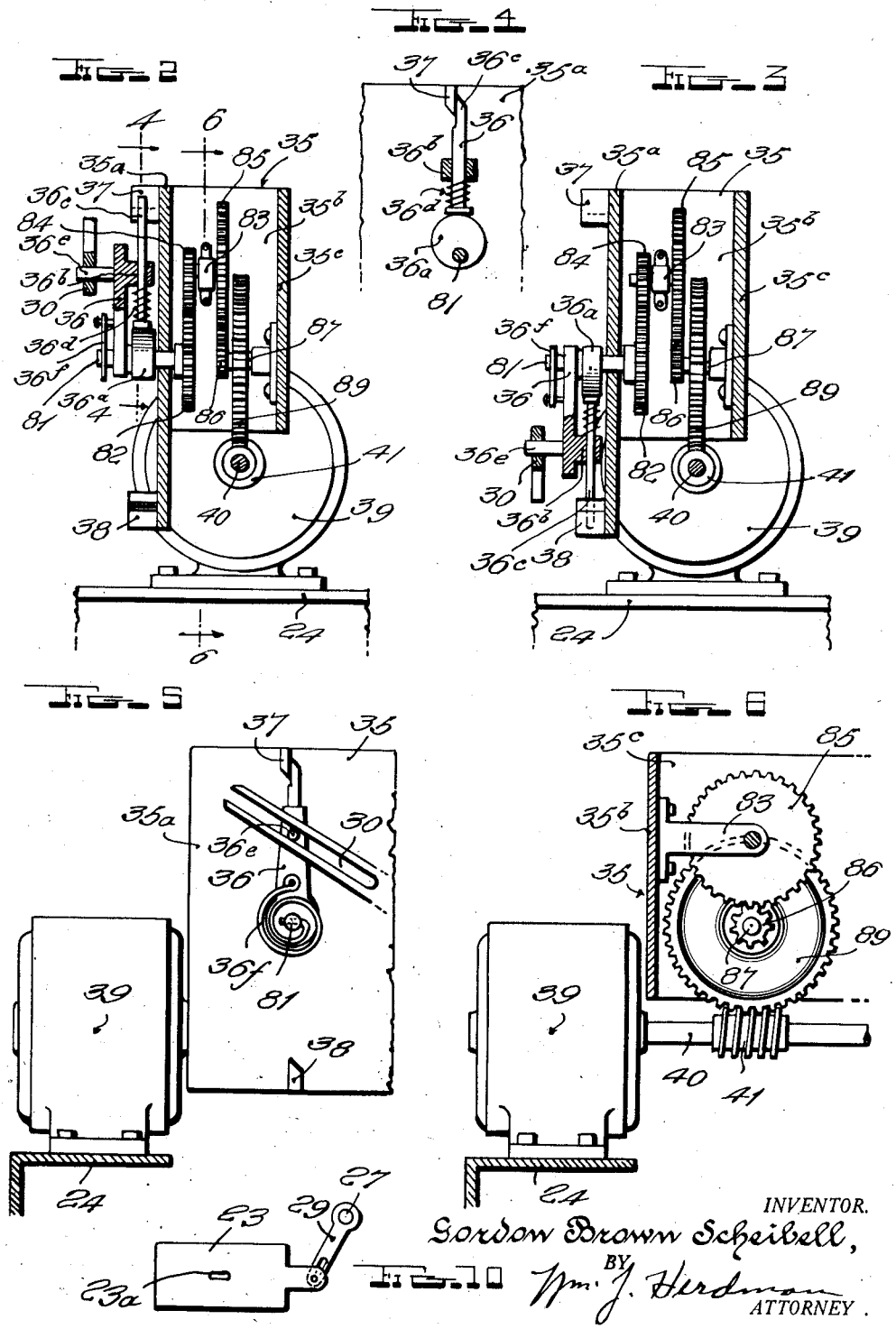

May 18, 1937.   G. B. SCHEIBELL   2,080,835
CONTROL SYSTEM
Original Filed April 11, 1930   3 Sheets-Sheet 3
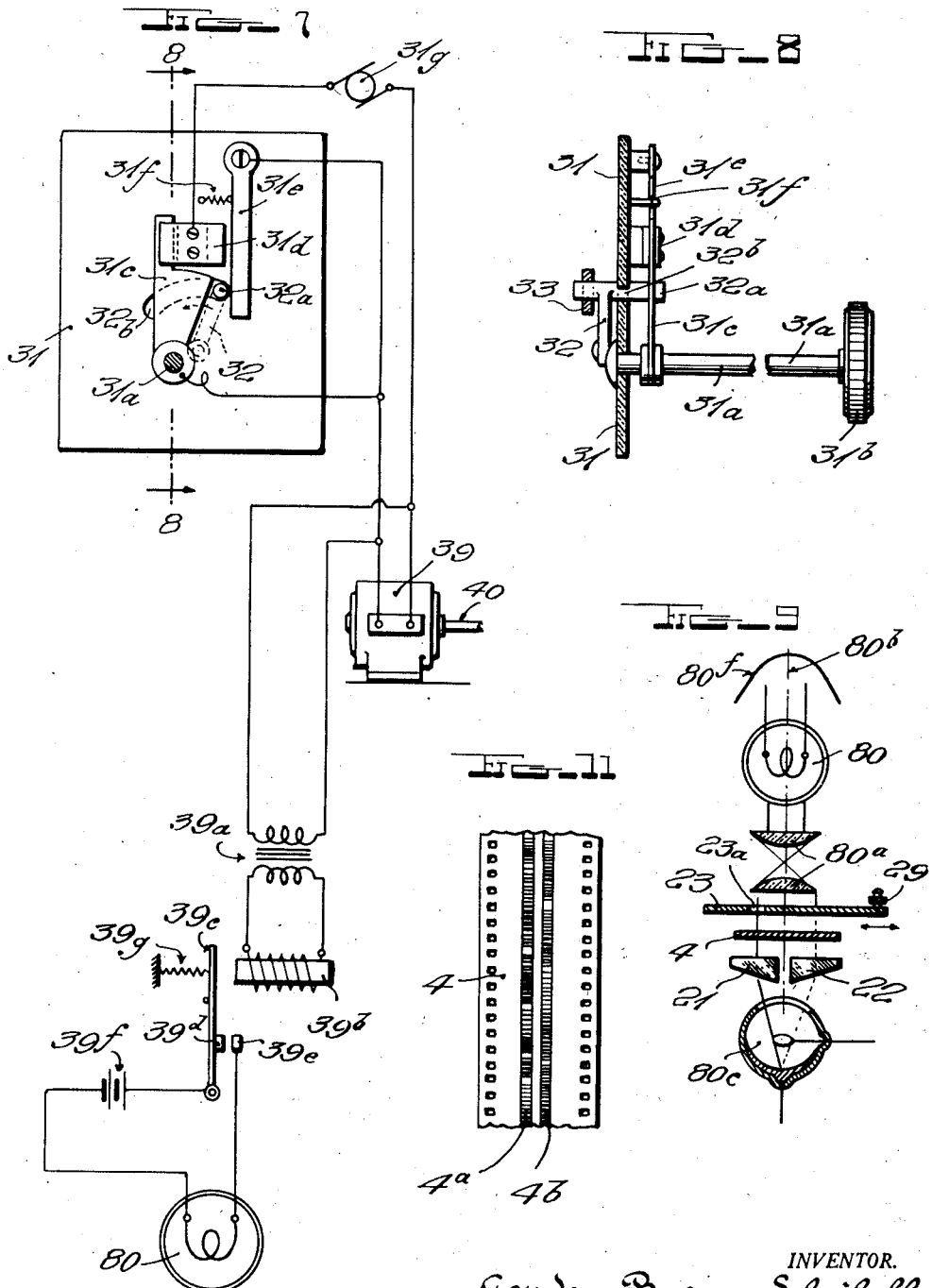
INVENTOR.
Gordon Brown Scheibell,
BY
Wm. J. Herdman
ATTORNEY.

Patented May 18, 1937

2,080,835

UNITED STATES PATENT OFFICE 2,080,835

CONTROL SYSTEM

Gordon Brown Scheibell, Millburn, N. J.

Original application April 11, 1930, Serial No. 443,398, now Patent No. 2,005,596, dated June 18, 1935. Divided and this application January 16, 1935, Serial No. 2,135. In Canada April 18, 1933

12 Claims. (Cl. 179—100.3)

My invention pertains broadly to control systems and specifically relates to apparatus for producing electrical and optical controlling operations at a predetermined time under control of a timing element, and is a division of application Serial No. 443,398, filed April 11, 1930, now Patent No. 2,005,596, issued June 18, 1935.

One of the objects of my invention is to provide an apparatus for automatically controlling an optical system at predetermined times.

Another object of my invention resides in providing means for effecting electrical controlling operations at predetermined times.

A further object resides in the provision of apparatus for interdependently causing the automatic operation of optical controlling and electrical controlling means under control of a timing element.

A still further object resides in the construction of automatic apparatus for transmitting motion between a driving element and movable optical and electrical controlling means.

These and other objects will be apparent from the following, reference being had to the accompanying drawings forming a part of this specification and in which like reference numerals designate corresponding parts throughout. In the drawings:

Fig. 2 is a detailed view illustrating the arrangement of the automatic timing and intermittent motion mechanism employed in my system;

Fig. 3 illustrates the mechanism of Fig. 2 in a shifted position;

Fig. 4 is a partial view of elements of Fig. 2, taken along the line 4—4 of Fig. 2;

Fig. 5 is an elevation showing the connection between the timing mechanism and shiftable parts for effecting the controlling operations;

Fig. 6 is a view taken through the time controlling mechanism on line 6—6 of Fig. 2;

Fig. 7 is a view of the switch control mechanism for performing electrical controlling operations at predetermined intervals;

Fig. 8 is a side view of a portion of the apparatus depicted in Fig. 7;

Fig. 9 is a schematic view showing the relationship between the shiftable aperture and the optical system according to the invention;

Fig. 10 is a plan view of a shiftable light aperture; and

Fig. 11 is a fragmentary portion of a film which may be used in the system of my invention.

Figure 1:
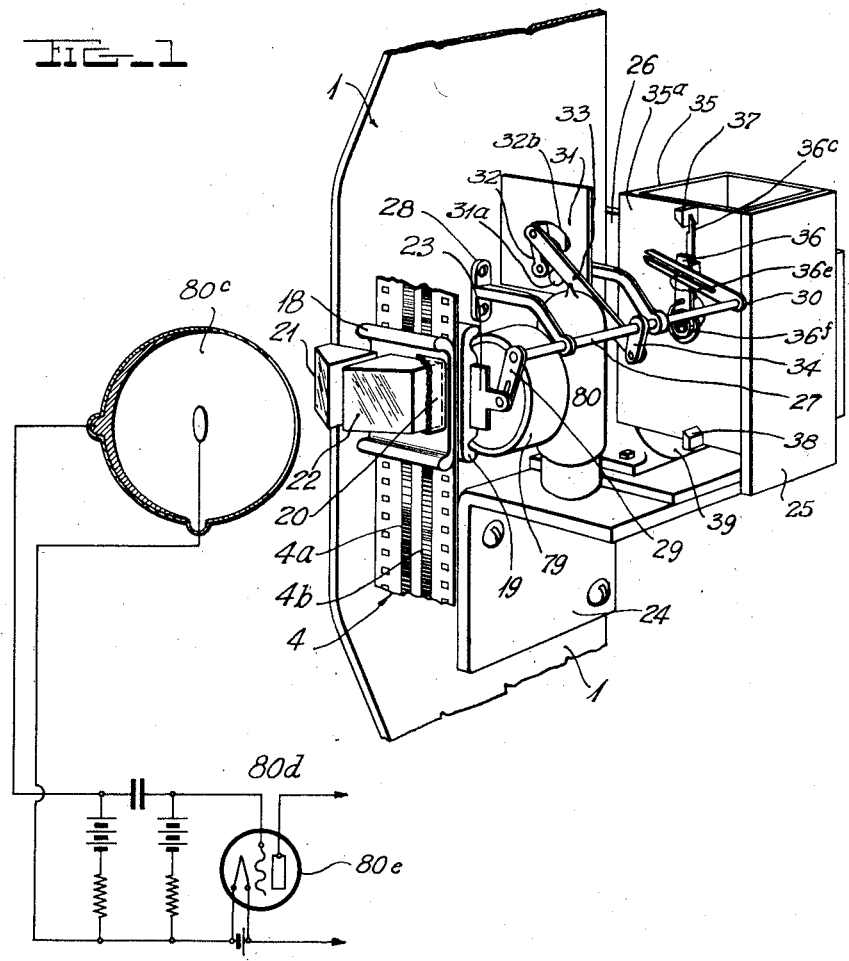
Fig. 1 is a perspective view of one embodiment of the electro-optical control apparatus according to my invention.

My invention contemplates the provision of automatic means for producing interdependent electrical and optical controlling operations at predetermined times. The invention provides continuously motor driven intermittent motion mechanism for producing controlling operations at periodic intervals to effect the movement of aperture means and concomitantly the control of electrical circuits, including a light source as well as a motor mechanically connected with the intermittent motion mechanism. Such apparatus has many uses, such as for example in a sound reproducing system employing a sound film having a plurality of adjacent sound records thereon for producing a continuous sound program without interruption from the various sound tracks on the film. Such a film may be of a reversible type with the sound tracks extending in opposite directions, or the film may be of a continuous loop type with the parallel sound tracks extending in the same direction. Although the invention will be described in connection with such a sound film having sound tracks thereon, it will be obvious to one skilled in the art that the features of the system are widely adaptable for many uses requiring automatic operations, and it will be understood, therefore, that my invention is not to be specifically limited.

In Fig. 1 reference numeral 1 designates a frame and reference numeral 4 designates a film, which, in the present embodiment, is provided with sound tracks 4a and 4b disposed on different longitudinal portions thereof intermediate the rows of perforations. This film may be fed by any suitable form of film-feeding mechanism. If it be preferred to use a film of the reversible type, the film-feeding mechanism may be of a construction such as shown in application Serial No. 443,398. For the purpose of properly guiding the film I provide members 18 and 19 secured to the frame 1 between which the film 4 passes. The central portion of the member 18 is open to fit a lens box 20 into which are mounted two prisms 21 and 22. The member 19 has a longitudinal slot into which an aperture plate 23 slidably fits. At the back of the frame 1 is a mounting bracket 24. A frame 25 is mounted parallel to the frame 1 on the bracket 24. A strengthening member 26 extends from the frame 1 to the frame 25 and is secured at opposite ends to both. A shift rod 27 extends from a bearing in the frame 25 through a bearing support which is secured to the frame 1. At one end of the shift rod 27 is a coupling link 29 which couples the shift rod 27 to the aperture plate 23. At the other end of the shift rod 27 is a shift yoke 30.

A switch panel 31 is mounted on the frame 1 and at right angles thereto. An arm 32 which is part of a switching arrangement mounted on the switch panel 31, more fully described hereinafter, is connected by a coupling link 33 to another arm 34 which is secured to the shift rod 27. A box 35 which contains a timing element, more fully described later, is mounted on the back of the frame 25. On the side of the box 35 adjacent the shift rod 27 is an arm 36, more fully described hereinafter, which revolves in a plane parallel to the surface of the box 35 upon which it is mounted. Two stops 37 and 38 are secured to the box 35 and located so that they intercept the path of the arm 36 every 180 degrees. A driving motor 39 is mounted upon the bracket 24. Centrally located upon shaft 40 of motor 39 is a worm 41 which engages a gear of the timing element of the box 35 described hereinafter.

Mounted directly behind the member 19 and secured to the frame 1 is a lens box 79. This lens box is part of the optical system which will be fully described later. In line with the lens box 79 and mounted on the bracket 24 is an exciting lamp 80 suitable for use in conjunction with a photoelectric cell.

In Fig. 1 a photoelectric cell 80c is shown in its relative position with reference to the structure of the mechanism. A portion of the photoelectric cell circuit is schematically illustrated at 80d including an amplifier tube 80e leading to the sound reproducing circuit.

Fig. 11 shows a typical portion of the film for use with the projector of my invention. As shown this film has a multiplicity of parallel channels of sound recordings 4a and 4b, the arrows indicating direction of recording. It will be seen that one channel is reproduced in one direction and that the other channel is reproduced in the opposite direction.

Fig. 2 is a detail view of the interior of the box 35 containing the timing element in the form of an intermittent motion mechanism. The shaft 81 is journaled in one side 35a of the box 35. Mounted on this shaft 81 is the arm 36 as shown in Figs. 2 and 3. Mounted upon the same shaft but upon the other side 35a of box 35 is a spur gear 82. A bearing which is secured to the side 35b of the box 35 carries a shaft upon which is secured a large spur gear 85, and also a small spur gear 84 which meshes with the large spur gear 82. This large spur gear 85 meshes with another spur gear 86, which is in turn secured to a shaft 87 mounted in the wall 35c of the box 35. Secured to this shaft 87 is a large worm wheel 89 which meshes with the worm 41 described elsewhere. This worm 41 is mounted upon the shaft 40 which is driven by the motor 39. It will be seen that this gear train appreciably reduces the number of revolutions per minute transmitted from the driving shaft 40 and delivered to the shaft 81. This train of reduction gears is to be so constructed that there will be a 180 degree revolution of the shaft 81 at a predetermined time.

The shaft 81 extends through one end of the arm 36. A cam 36a is eccentrically mounted on the shaft 81 and is rotated in a plane parallel with the arm 36 as shown in Fig. 4. A sliding bearing 36b is mounted upon the outer end of the arm 36. Slidably positioned in this bearing 36b is a pawl 36c. One end of this pawl 36c is notched in the manner shown to engage with the stops 37 and 38. The other end of this pawl is shouldered to form a bearing which rides upon the cam 36a. Mounted upon the pawl 36c and between the shoulder thereon and the bearing 36b is a spring 36d. This spring exerts pressure against the shoulder of the pawl and forces it continuously in contact with the periphery of the cam 36a. It will be seen that a revolution of the shaft 81 will cause the pawl 36c to move up and down with reference to the center of the shaft 81. Mounted upon the reverse side of the arm 36 is a pin 36e which engages in a slot in the shift yoke 30. The spiral spring 36f is coiled about the end of the shaft 81 which projects through the arm 36. This spring is secured at one end to the arm 36 and at the other end to the shaft 81. The spring is so shaped and positioned that there is a continual pressure transmitted from the shaft to the arm 36 in the direction of rotation. Rotation of the shaft 81 tends to increase this spring pressure. The purpose of the mechanical elements of this arm 36 is to provide a very quick motion of the arm 36 at a predetermined point of rotation of the reduction gear train.

Figs. 7 and 8 represent a switch for starting and stopping the driving motor. The panel 31 of insulating material has mounted thereon a shaft 31a to which is attached an insulating knob 31b. A contacting sector 31c is secured to the shaft 31a and positioned so that it will engage with the double contact 31d secured to the panel. A contacting knife 31e is pivotally secured to the panel 31 and positioned so that it will engage with the other side of the contact 31d. A spring 31f is provided between the panel and the contacting knife 31e for normally holding the knife 31e in engagement with the contact 31d. An arm 32, which is shown in Fig. 1, is also mounted upon the panel 31. Mounted upon the free end of this arm 32 is a projection 32a which extends through an arcuate slot 32b in panel 31 and engages with the contacting sector 31c and contacting knife 31e in the manner indicated. The aperture 32b is cut on a radius of the center of the arm 32 and in the shape shown. Connected to the arm 32 as shown in Fig. 8 there is a section of the coupling link 33 as shown in Fig. 1. It will be seen that movement of the arm 32 in the direction indicated by the arrow in Fig. 7 will cause the contacting sector 31c to disengage with the contact 31d, and the contacting knife 31e to engage with contact 31d. Motion in the opposite direction will cause a reverse procedure. An electrical energy source 31g is provided for driving the motor 39. Connected across the line to the source 31g are the contacting sector 31c and contacting knife 31e. As shown in Fig. 7, after initially closing the contacting sector 31c manually by means of the knob 31b, the motor will be running. Also connected across the power line to the motor is a transformer 39a which supplies current for a magnet 39b. This magnet 39b actuates an armature 39c carrying contact 39d which engages with another contact 39e. Contacts 39d and 39e in engagement close a circuit from a suitable electric source 29f to the filament of the exciting lamp 80. The armature 39c is held away from the magnet 39b by means of a spring 39g.

Movement of the arm 32 causes the projection 32a to disengage the contacting sector 31c. But before the contacting sector 31c is brought out of engagement with the contact 31d, the contacting knife 31e engages with the contact 31d by means of tension of the spring 31f. Return of the projection 32a on the arm 32 will force the contacting knife 31e away from engagement with the contact 31d. The contacting sector 31c, however, is not made to return to engagement with the contact 31d, and consequently the circuit will be broken and the motor 39 is shut down.

It will be seen that by manually or under electrical control closing the contacting sector 31c with respect to contact 31d the operation of motor 39 is initiated.

Fig. 10 shows the aperture plate 23 containing aperture 23a coupled by means of the coupling link 29 to the shift rod 27. The aperture 23a in the plate 23 is of a nature best suited for admitting a proper light beam to the film. Further, it is of such a size and position that it will admit a light beam to but one channel of the sound record on the film 4.

Fig. 9 is a schematic representation of the lens system used in the system. The exciting lamp 80, the condensing lenses 80a, the aperture plate 23, the film 4, the prisms 21 and 22, and the photoelectric cell 80c, are symmetrically located about an axis 80b shown in Fig. 9. Parallel light rays from the exciting lamp 80 are intercepted by the aperture plate 23 and passed through the aperture 23a. A parabolic reflector 80f is located behind the lamp 80 for directing the light rays toward the film 4. The aperture 23a admits a suitable beam of light to the film 4 and subsequently to one of the prisms 22 or 21, which in turn bends the beam to focus upon the sensitive portion of the photoelectric cell 80c. It will be seen that the aperture plate 23 will admit a beam of light from the exciting lamp 80, first to one sound channel 4a on the film and then, when shifted, to the other sound channel 4b, and the light beam upon coming from either side of the film will be focused upon the photoelectric cell 80c. An advantage of such an arrangement is that the exciting lamp is symmetrically located with reference to the photoelectric cell 80c, and will give uniform intensity for both channels of sound recording 4a and 4b, with subsequent uniformity of reproduction.

When the operator desires to start the mechanism he will close the contacting sector 31c by means of the knob 31b shown in Fig. 8 or under remote electrical control by a solenoid switch. This will start the motor 39 and, at the same time, the exciting lamp circuit will be closed by means of the magnet 39b, as in Fig. 7.

Referring back to Fig. 2, as the film is running through by any suitable film-feeding means, the train of reduction gears in the timing element in box 35 revolves the shaft 81. At an exact predetermined moment the shaft 81 will have revolved 180 degrees by means of the train of reduction gears and caused the cam 36a to release the pawl 36c from engagement with the stop 37. The arm 36 will then very quickly revolve 180 degrees in the direction of rotation of the shaft 81 by means of pressure of the spring 36f. The projection 36e on arm 36 which engages with shift yoke 30 will cause the same to partially rotate the shift rod 27 and thereby move the aperture plate 23 so that the aperture 23a admits a light beam from the exciting lamp to the other sound channel 4b. Further, at the same time, the coupling link 33 will cause the arm 32, mounted on the panel 31, as shown in Fig. 1, to disengage the contact 31c from contact 31d and allow the contacting blade 31e to engage with the contact 31d, thereby continuing the electrical circuit from source 31g to the motor 39. If of a reversible type, the film may then be driven in a reverse direction, but if of the continuous loop type, the film will continue to move in the same direction as before, but with the light directed through a different sound track.

At a further predetermined time the arm 36 will complete another sudden 180 degree rotation. The last movement of the arm 36 will shift the aperture plate 23 so that the aperture 23a again admits a beam of light to the first sound channel 4a, and move the coupling link 33 so that the arm 32 returns to the position shown in Fig. 1 and disengage the contacting knife 31e from contact 31d. The electrical circuit to the motor 39 will be broken, as the contacting sector 31c is not now in engagement with contact 31d, and the transformer 39a will cease to supply current to the magnet 39b, and the armature 39c will break the filament circuit of the exciting lamp. The mechanical elements of the apparatus will be in an initial starting position as first described.

While I have described my system in a preferred embodiment, it will be understood that changes therein will readily occur to those skilled in the art but which will not depart from the intended scope of my invention. I do not, therefore, desire to limit myself to the foregoing except as may be pointed out in the appended claims.

I claim:

1. Apparatus comprising a film, sound projection apparatus having a source of light for cooperation with said film, a source of electrical energy, manually operable means for effecting the establishment of an energizing circuit between said source of electrical energy and said source of light, and automatic means for causing the interruption of said circuit at a predetermined time after establishment of said circuit.

2. Apparatus in accordance with claim 1 in which said automatic means causing said interruption of said circuit moves said manually operable means to a position requiring the further operation of said manually operable means for the further establishment of said circuit.

3. The combination of a photosensitive device, means for producing a beam of light incident upon said photosensitive device, means for controlling said beam of light at predetermined time intervals, and timing means for operating said means, said timing means comprising motor driven gears and a quick-acting spring driven device periodically operated thereby.

4. Sound projection apparatus comprising a film, a motor, a source of electrical energy for said motor, a manual switch for establishing an energizing circuit to said motor, automatic means operable at a predetermined time for moving said switch to interrupt said circuit established thereby, automatic means concomitantly operated but preceding said last mentioned operation for establishing a circuit to maintain the energization of said motor, said means being further operated at a subsequent predetermined time for interrupting said last established circuit to said motor whereby said motor is deenergized and said manual switch rendered operative for establishing a subsequent energizing circuit to said motor.

5. Film apparatus comprising, a film, an electrical source of light, an aperture plate cooperating with said film for refining said light in a beam substantially less in width than the width of said film, means for electrically controlling said source of light, and means for commonly operating said last mentioned means and said aperture plate.

6. Film apparatus comprising, a film, a source of light, an aperture plate cooperating with said film for defining said light in a beam less in width than the width of said film, means for moving said aperture plate with reference to said film and means for electrically controlling said source of light at a predetermined point of movement of said aperture plate.

7. Film apparatus comprising, a film, an electrical source of light, an aperture plate cooperating with said film for defining said light in a beam substantially less in width than the width of said film, means for electrically controlling said source of light, and motor driven means for causing the operation of said last mentioned means and for moving said aperture plate.

8. Film apparatus in accordance with claim 7 in which said motor driven means moves said aperture plate and causes the operation of said light controlling means at a predetermined time.

9. Circuit-controlling apparatus comprising, a switch, quick-acting snap mechanism for operating said switch including, a movable releasing device, resilient means in which energy may be stored in accordance with movement of said releasing device, actuating means for storing energy in said resilient means and including timing gears for effecting the operation of said releasing device at a predetermined time, and a manually settable element for effecting the initiation of operation of said train of reduction gears.

10. A circuit controlling apparatus in accordance with claim 9 in which said manually settable element is mechanically arranged for operating said switch in addition to the operation thereof by said quick-acting snap mechanism.

11. Apparatus comprising, movable circuit controlling means, and means for manually and automatically controlling said circuit controlling means and including a mechanical snap-acting element, a movable releasing device for said element, resilient means for storing operating energy, said resilient means being mechanically connected with said releasing device, timing gears for timing the operation of said releasing device to operate said circuit controlling means at a predetermined time, and a manually settable element for mechanically actuating said circuit controlling means.

12. Projection apparatus comprising, a film having a plurality of record tracks, a source of light, a motor and circuit therefor, means for defining light from said source into a beam, means operated by said motor for relatively moving said beam of light and said film transversely with respect to each other, and means for controlling said circuit to deenergize said motor after predetermined relative movement of said light beam.

GORDON BROWN SCHEIBELL.